April 7, 1953          H. H. VANDERZEE ET AL          2,634,402
                      PHONOGRAPH SELECTOR SYSTEM
Filed Feb. 2, 1948                              7 Sheets-Sheet 4
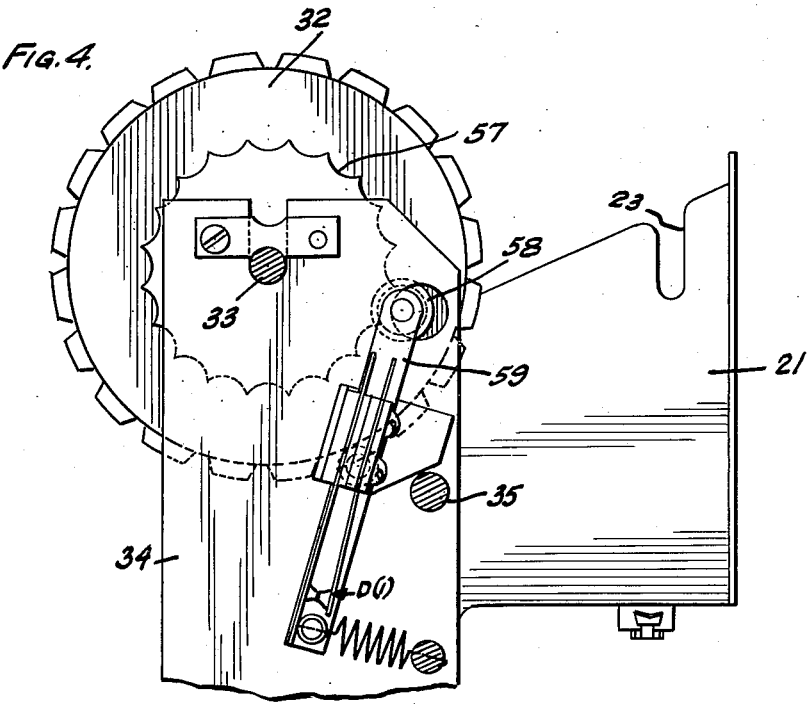
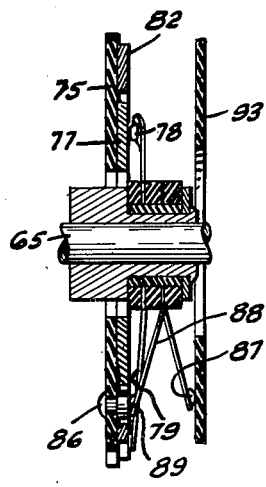
Fig. 8.
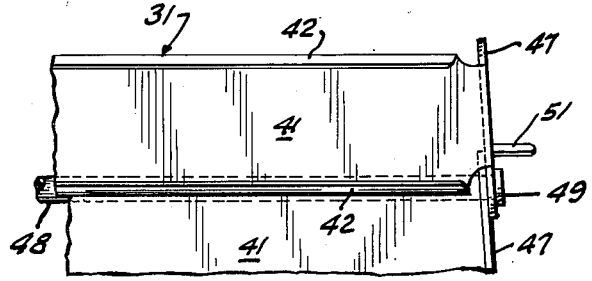
Fig. 13.
INVENTORS.
H. H. VANDERZEE
BY R. A. McCALLUM
BY Clarence J. Loftus
ATTY.

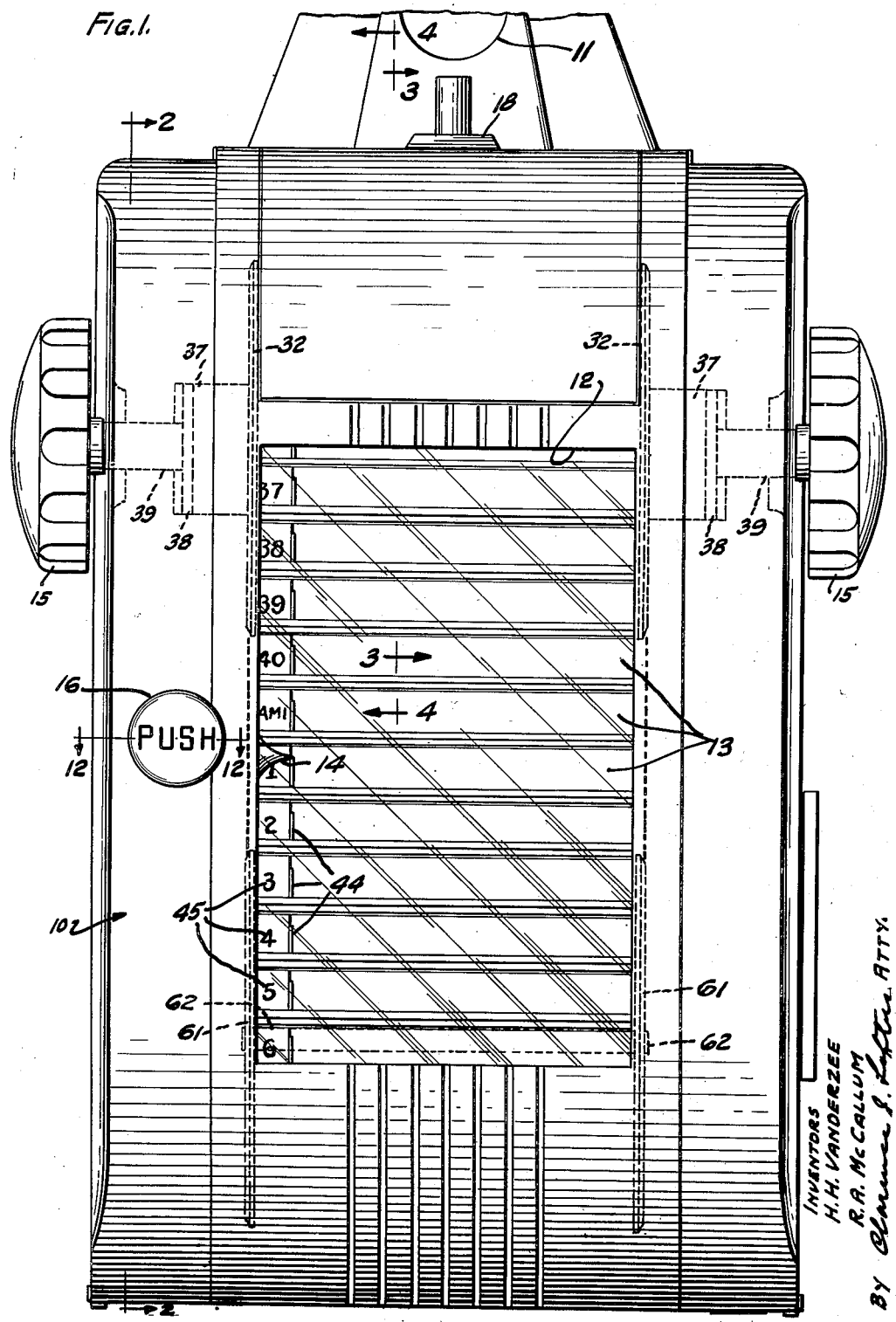

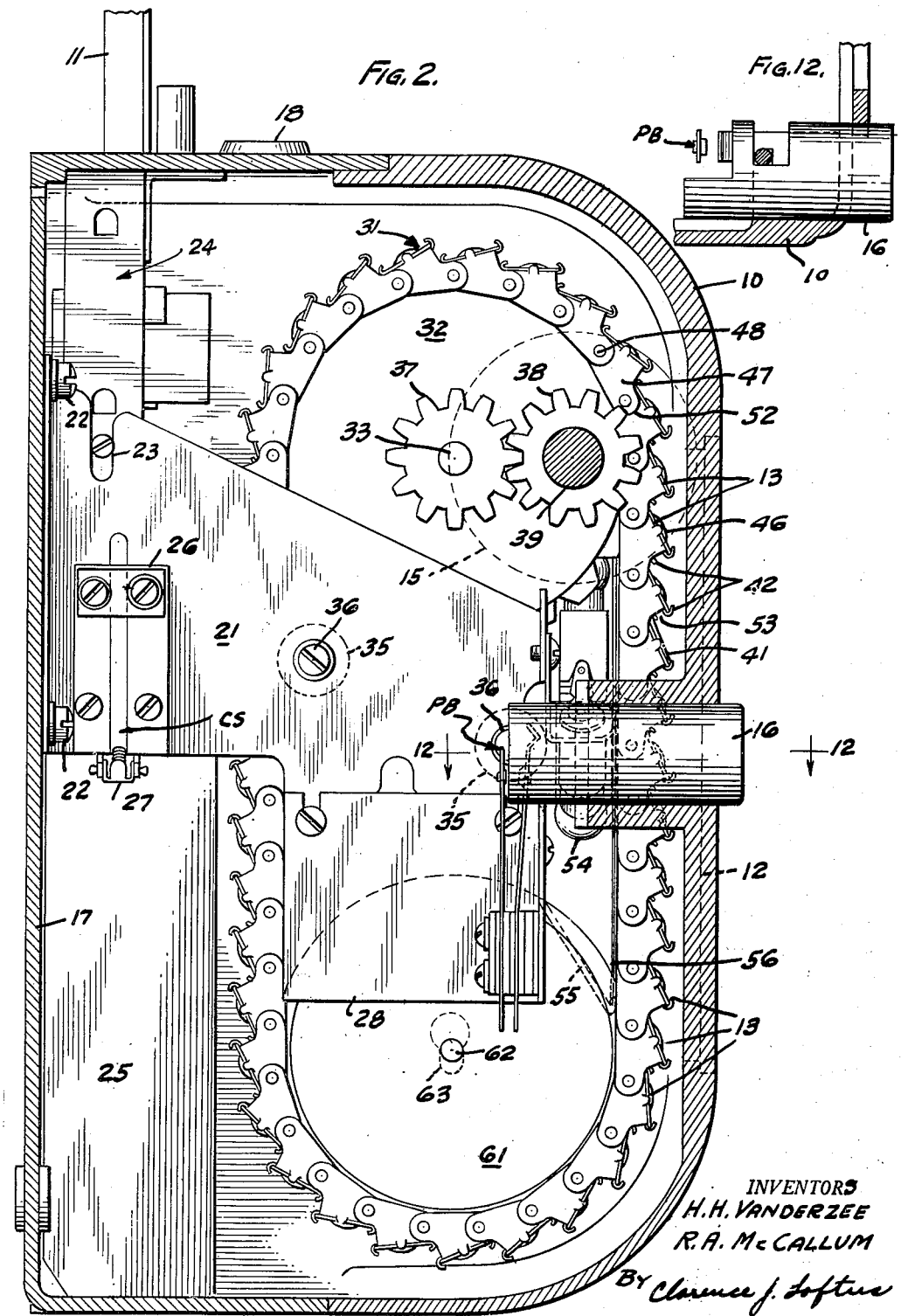

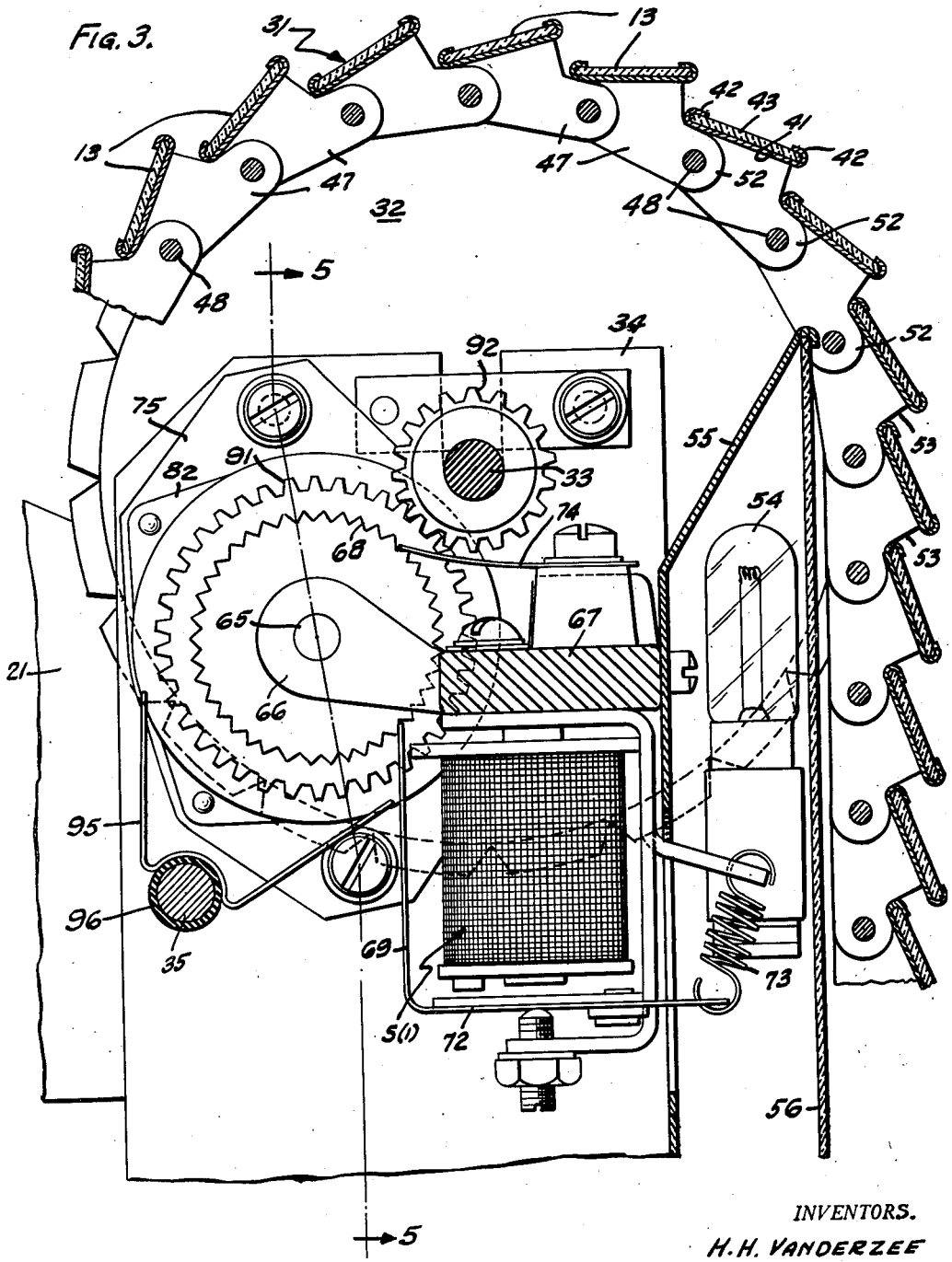

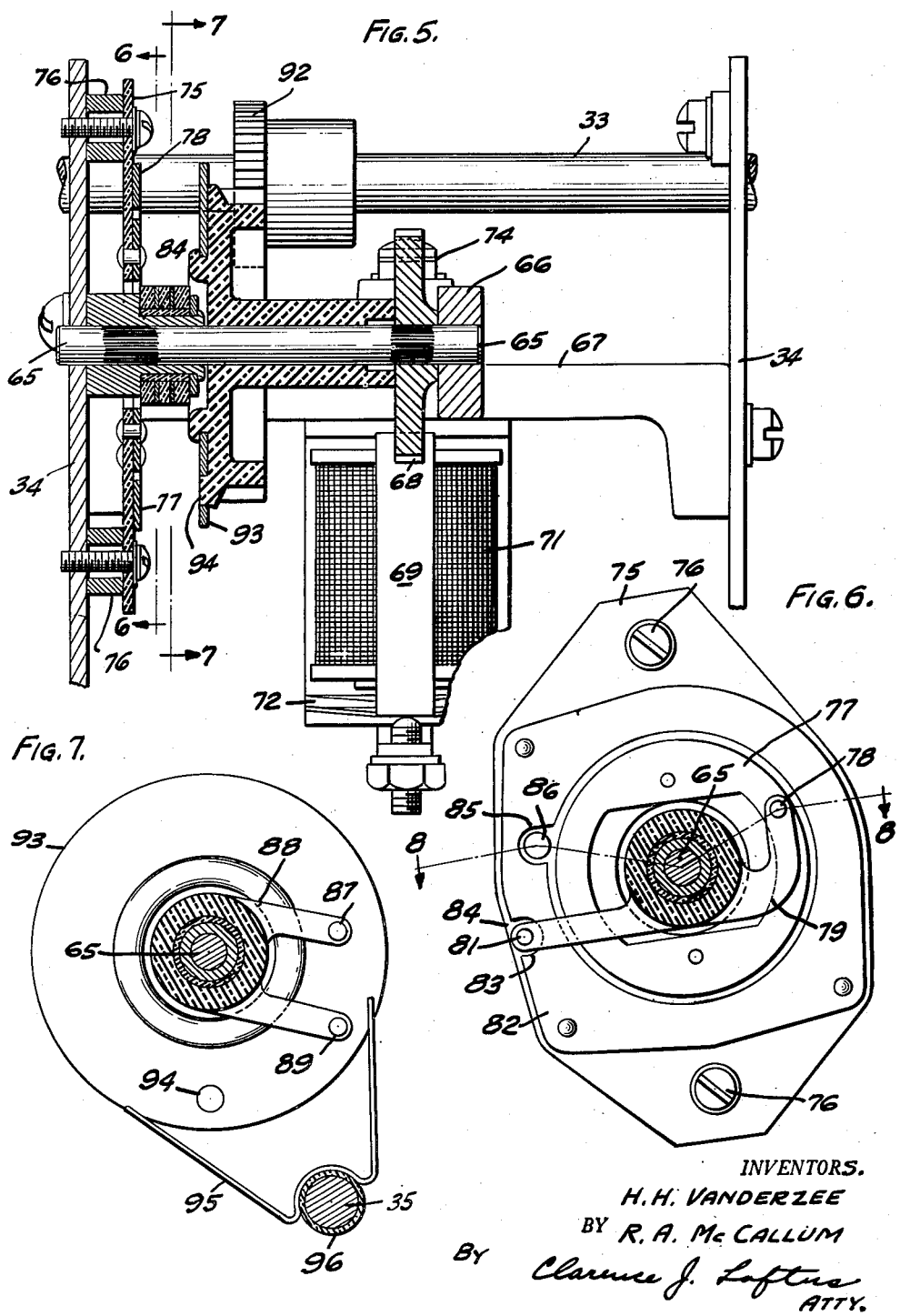

April 7, 1953    H. H. VANDERZEE ET AL    2,634,402
PHONOGRAPH SELECTOR SYSTEM
Filed Feb. 2, 1948    7 Sheets-Sheet 6

INVENTORS
H. H. VANDERZEE
R. A. McCALLUM
BY Clarence J. Loftus
ATTY.

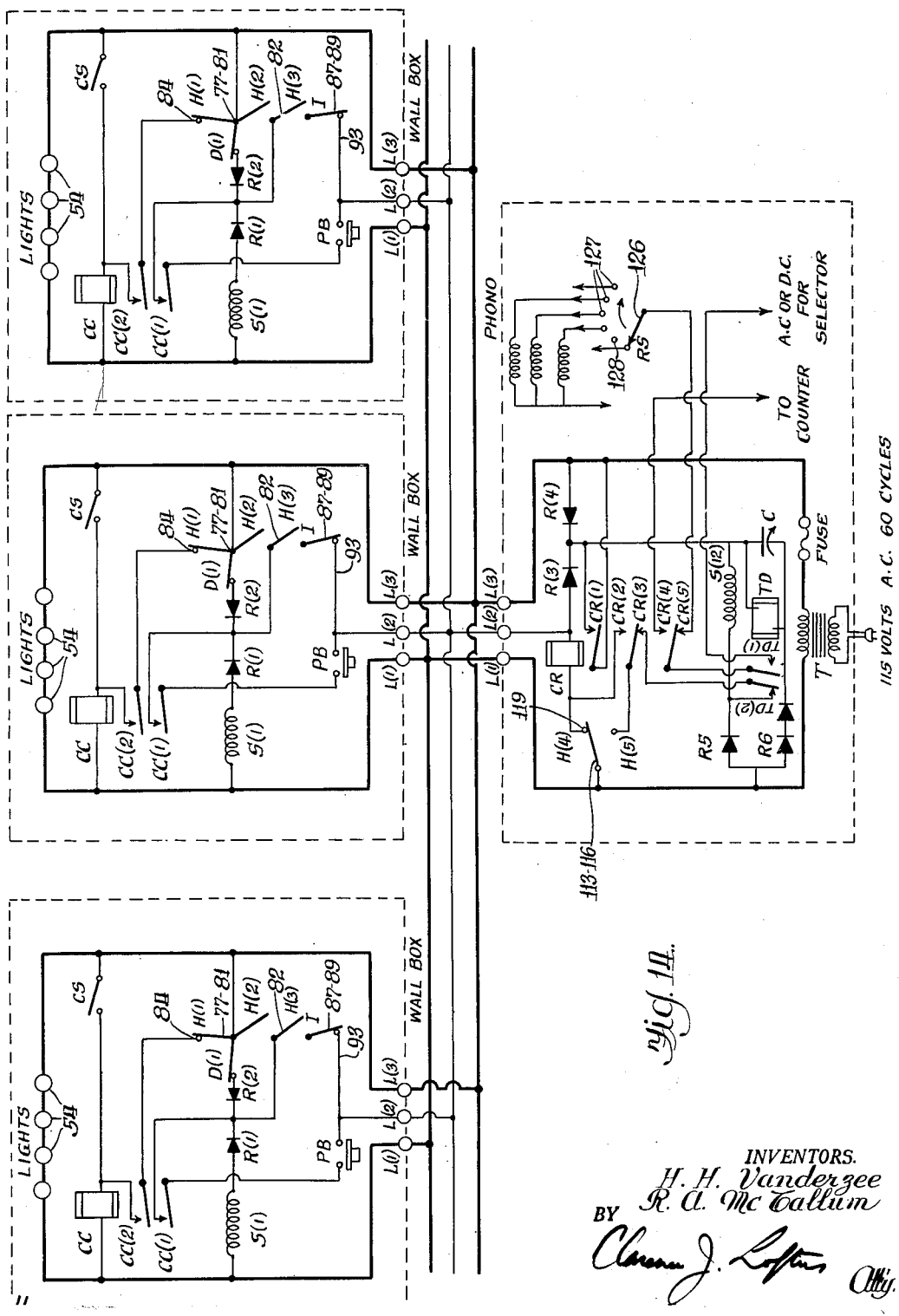

Patented Apr. 7, 1953

2,634,402

UNITED STATES PATENT OFFICE 2,634,402

PHONOGRAPH SELECTOR SYSTEM

Harry Herbert Vanderzee, Grand Rapids, Mich., and Robert A. McCallum, Clarendon Hills, Ill., assignors, by mesne assignments, to A M I Incorporated, a corporation of Delaware Application February 2, 1948, Serial No. 5,854

7 Claims. (Cl. 340—162)

The present invention relates to record selection mechanisms for automatic coin controlled phonographs, and particularly to a remote control selection system whereby the record selection for an automatic phonograph may be made from any one of a number of stations remote from the machine, to permit the use of multiple wall boxes, each including a coin control and a manually operable selector.

It is the general aim of the present invention to provide simpler, more reliable, and less expensive remote control devices than those heretofore used, so designed that although they permit quick selection of any desired record from a large list of titles, yet they do not require the multiple conductor cables commonly employed in prior remote control selector circuits, and do not involve the difficulties of manufacture and service that have rendered previously known devices objectionable.

In introduction, it may be explained that in a typical automatic phonograph installation it is advantageous to install quite a number of wall boxes, each including a record title selector and coin control, so that the phonograph may be played from various locations, as from the several different booths of a restaurant. It follows that to be ideal for the intended purpose it is not only necessary that the control system be satisfactory in operation, but it is equally important that the wall box units be inexpensive enough so that the initial cost of installation is not prohibitive. In this connection it must also be kept in mind that the system includes not only the phonograph and the wall boxes, but in addition requires electrical wiring to illuminate the boxes and to actuate the selector mechanism.

Many wall boxes previously known have required, in addition to their lighting circuits, a separate conductor extending from the box to the phonograph, for each selection that is to be made. Now, if a large list of selections is presented (as the forty selections listed in the present machine), it will be seen that a forty-conductor cable will be required to effect the selections, to say nothing of the additional conductors necessarily provided for a return circuit, credit circuit for the coin control device, and lamp circuit to illuminate the list of titles. Such an arrangement is not only expensive but is difficult to install, connect and service; and large cables, while not easily concealed, are unsightly if left exposed to view.

This problem has long been recognized in the art, and many and various attempts have been made to develop a satisfactory solution. It appears, however, that the various other qualities necessary for satisfactory performance have been seemingly irreconcilable, and that in developing a system capable of reducing the number of conductors required, prior designers have invariably introduced new complications into the systems which have been almost equally disadvantageous, and consequently have largely defeated the objects of their invention. Typical examples of such efforts are systems wherein the lighting and selector circuits are combined and the selection transmitted by coded pulses, or where the control is done without wires by radio. In the first of these, the pulsing devices introduce mechanical complications; and in addition the circuits appear to require full-wave rectifiers and filters to provide a direct current power supply. This additional equipment, when made large enough to supply the lamp circuits as well as effect the selection, is not only expensive, but makes the system unjustifiably wasteful of electric power. The radio controls are even more costly, since they are necessarily of quite intricate design and require much expensive equipment.

Thus although the problem to which the present invention relates has plagued workers in the art for many years, it has been heretofore without an entirely satisfactory solution.

It is accordingly the primary object of the present invention to overcome the known shortcomings of prior control systems, and to provide a novel and improved system wherein the various factors are so reconciled that the system, while permitting selection from a large list of titles, does not require a large number of conductors; yet effects a selection quickly, dependably, with simple and inexpensive mechanical and electrical components, and with minimum consumption of energy.

A further object of the invention is the provision of a wall box control device having an improved and simplified working mechanism characterized by the absence of the large number of electrical contacts ordinarily employed, so that service difficulties are decreased and losses of revenue due to periods of inoperation are materially reduced.

The foregoing objects are accomplished in the present invention by the provision of a remote control system wherein a multiplicity of selection titles are displayed in a number of wall boxes located at various points remote from the phonograph; with a manually shiftable device at each box to effect a selection of any of the titles desired, and electrical circuits to transmit this information to the phonograph and play the desired record. The circuit here employed requires, in addition to the pair of leads to the lamps of the wall box, only one wire for the selector circuit.

The remote control mechanism employs a multiple contact selector switch in the phonograph, with a single switch arm and a contact corresponding to each selection, so that multiple leads may be extended from the switch to the corresponding magnets of a mechanical record selector. The switch is automatically rotated by a synchronous driving motor controlled by a set of "homing" contacts, so that it has a normal position of rest, but when actuated will automatically advance a full revolution to progressively scan each of its contacts in rapid succession. Since the movement of the switch is governed by a synchronous motor, it will scan the contacts at a fixed and determinable rate of speed, and if the switch arm is momentarily energized during the scanning it will actuate the selector magnet corresponding to the contact on which it rests at the instant of energization. A selection of any desired record may then be made by transmitting a time interval signal to the switch, to energize its scanning arm at the precise instant it rests on a given desired contact. By the present invention, this interval signal is generated in the wall box, by an interval timer that is controlled by the title selector mechanism and set to measure a different time interval for each of the several possible selections. Means are provided to start the interval timer and begin rotation of the selector switch at the exact same instant, so that variations in the duration of the signal will result in energizing the switch at corresponding contacts. In short, the mechanism provides means in the wall box for translating a selection of any one of a multiplicity of titles into a time interval signal of different duration, together with instrumentalities in the phonograph to translate this time interval signal back into a record selection corresponding to the title selection made at the wall box.

A preferred commercial embodiment of the invention is illustrated in the drawings of this disclosure, wherein:

Figure 1 is a front elevational view of a wall box remote control unit constructed in accordance with the teachings of this disclosure;

Figure 2 is a transverse sectional view taken substantially on the plane of the line 2—2 of Figure 1;

Figure 3 is an enlarged fragmental sectional view taken substantially on the plane of the line 3—3 of Figure 1;

Figure 4 is a transverse sectional view taken substantially on the plane of the line 4—4 of Figure 1, and looking in the opposite direction from which Figure 3 is shown;

Figure 5 is an enlarged sectional view of the interval timing mechanism, and is taken substantially on the plane of the line 5—5 of Figure 3;

Figure 6 is a detail sectional view of the homing contacts of the interval timer and is taken substantially on the plane of the line 6—6 of Figure 5;

Figure 7 is a detail sectional view of the interrupter contacts of the interval timer, and is taken substantially on the plane of the line 7—7 of Figure 5;

Figure 8 is a detail plan sectional view taken on the plane of the line 8—8 of Figure 6;

Figure 12 is a detail sectional view of the manually operable push-button contacts by which the operation of the selection system is initiated at the wall box, the figure being taken on the plane of the line 12—12 of Figure 2;

Figure 13 is a detail fragmental elevational view of the links of the title holder chain; and Figure 14 is a schematic wiring diagram of the selector system.

Figure 11:
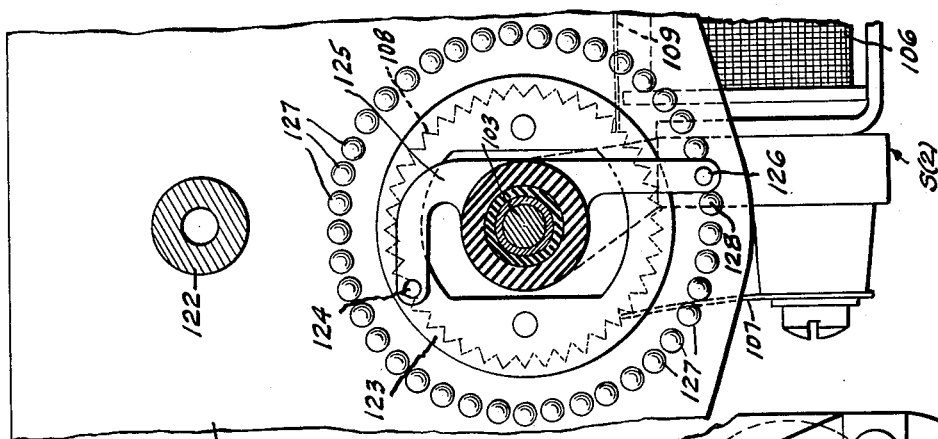
Figure 11 is a detail sectional view of the selector contacts of the power operated switch of the receiving unit, taken substantially on the plane of the line 11—11 of Figure 9.

The remote control unit is conveniently made in the form of a small metal box or case 10 having one or more coin chutes 11 and a window 12 in which a number of record title cards 13 are displayed. As shown, this window has an indicated indexing point 14 and is provided with a pair of manually operable selector knobs 15 to move the various title cards 13 up and down across the window, so that any desired title may be indexed by the mark 14. The selection is then made by manually depressing the push-button 16.

The wall box includes a back plate 17 which is ordinarily secured to some fixed supporting surface, so that the box and its internal mechanism are immovable unless detached from the back supporting structure in the conventional manner. The internal mechanism of the wall box is carried by a pair of mounting brackets 21, each secured to the back plate by cap screws 22 and slotted at 23 to support the slug rejector 24 below the coin chute 11. A coin box 25 is also provided, but since these parts may be conventional they will not be described in greater detail. The left-hand mounting bracket 21 carries a contact block 26 supporting a pair of contacts CS, arranged to be momentarily closed whenever a coin falls from the slug rejector 24 to the coin switch lever 27. The bracket 21 also carries a contact mounting plate 28 on which a pair of spring contacts PB are mounted. These contacts are positioned immediately behind the push-button 16, so that the contacts will close in response to manual actuation of the button.

The title holder of the box, the subject matter of my divisional application 56,493, now Patent No. 2,519,299 issued August 15, 1950, is in the form of an endless chain 31, the upper end of which passes over and is carried on a pair of sprockets 32 fixed at the opposite ends of a horizontal shaft 33. The chain loop hangs down from the sprockets 32 with its front span immediately inside the glass window pane 12 and its back span alongside the slug rejector 24 and coin box 25 of the unit. The shaft 33 is journaled in a pair of side plates 34, which are in turn supported between the brackets 21 by spacers 35, secured to the brackets 21 by screws 36. The sprockets 32 each includes a hub in the form of an outwardly projecting gear 37. These gears 37 overhang the brackets 21 and are each in mesh with one of a pair of fiber gears 38 carried on the inner ends of the stub shafts 39 of the selector knobs 15. The chain 31 consists of a multiplicity of identical links, each having a flat channel portion 41 with side flanges 42 along its upper and lower edges, so that a title card 43 carrying the name of one of the record selections may be slid into position from the right-hand end of the channel (Figure 1). A stop portion 44 is struck from the back of the panel (Figure 1) at a point near its left-hand edge to limit the inward movement of the title cards and to locate a selection number 45, which may be in the form of a plastic card also slid into the channel and held in place by a small tab.

The opposite ends of the individual channels are bent back to form link portions 47 and are pierced so that the several links may be joined by pins 48 to form a continuous chain. These pins are preferably headed, as indicated at 49, and small tabs 51 are struck from the metal of the links to overlie the head of each pin and prevent the chain from becoming disassembled. The link portions 47 of each channel are not exactly parallel with each other, but diverge slightly from the upper ends toward the lower ears 52 so that the lower ears of each link may overlie the upper portions of the adjoining link without binding. The lower loop of the chain passes around a lower pair of sprockets 61 mounted on a floating axle shaft 62, which extends through a pair of bayonet slots 63 in the side plates 34.

It is to be noted that the card receiving surface of the individual channels is not parallel with the length of the chain, but is at an acute angle thereto, so that the lowermost edge of each of the channels behind the window 12 overhangs the uppermost edge of the channel immediately below it. This arrangement defines a substantial gap 53 between adjacent channels, and permits light to pass through the chain from a light source behind it, but since the back surface of each channel is brightly polished, the back surfaces of each act as a mirror to reflect this light back downwardly to the face of the title selection cards. Thus all of the cards behind the window may be brilliantly illuminated, yet displayed without glare and without a visible source of illumination.

Illumination for the title cards is provided by a plurality of small incandescent lamps 54 mounted in suitable sockets between a reflector 55 and a translucent diffusing sheet 56, which is secured to the opposite ends of the reflector and positioned in a plane immediately behind the forward span of the chain, and since there are several lamps positioned at different points along the forward span of the chain it will be seen that their combined effect will be to produce substantially uniform lighting of the diffusing plate, from which the light is directed to the polished back surfaces of each channel and back down on the title cards.

From the foregoing, it will be apparent that any desired selection on the phonograph may be made by manually manipulating one of the knobs 15, which will act through the shaft 39 and pinion 38 to rotate the gears 37 and sprockets 32 and move the chain 31 to bring the desired title card adjacent the indexing marker 14. A step-by-step motion is accomplished by a detent including a notched wheel 57 on the inner face of one of the sprockets 32 and a detent roller 58 on a spring urged lever or rocker arm 59. This detent facilitates accurate alignment of the title cards with the marker 14 and prevents the chain from coming to rest in a position between two of the cards. The rocker arm 59 acts against a pair of detent contacts D(1), so that the contacts will open as the chain moves between adjacent title cards, and close when a title is properly indexed. Thus operation of the mechanism can be initiated only after the selection chain has been properly positioned.

It has been mentioned that the wall box includes means for generating a time interval signal together with means responsive to the movement of the title cards to set the signal generating mechanism to a different interval of time, corresponding to each of the several titles on the chain 31. This is accomplished by a timing mechanism including the push-button actuating contacts PB and an interval timer including a synchronous motor adapted to rotate at a fixed rate of speed and driving a contactor mechanism set according to the position of the selector chain 31, so that the length of the interval signal transmitted will be of different duration for each of the multiple title cards.

The mechanism includes a switch shaft 65, having one end journaled in one of the side plates 34 and the other end journaled in a boss 66 carried on a bracket 67 secured between the inner surfaces of the two side plates 34. The shaft 65 carries a forty-one tooth ratchet wheel 68 adapted to be rotated by the spring finger 69 of a synchronous stepping magnet S(1). As shown, this magnet includes an adjustable armature 72 on which the spring finger is mounted, so that motion of the armature causes the finger to engage the ratchet wheel 68 and advance it one tooth whenever the coil of the magnet is energized. A spring 73 returns the armature to its normal position after each step, and a leaf spring 74 mounted on the bracket 67 acts as a detent on the ratchet wheel 68 to prevent over-travel or return movement. The shaft 65 carries two sets of switch arms. A set of homing contacts are mounted on an insulating plate 75 near the other end of the shaft 65, as best shown in Figures 5 to 8. The plate 75 is spaced away from the plate 34 by screw and collar mounting parts 76. The plate 75 carries an internal commutator ring 77 which is at all times engaged by a rotating contact 78 on the short arm of a contact spring 79. This spring is carried in an insulating mount on the shaft 65, and has a longer arm carrying a contact 81 arranged to engage an outer contact ring 82. The ring 82 is notched at 83 and a contact 84 is located in the notch. The contact ring 83 and contacts 81 and 84 may be designated as "homing" contacts, since they function to maintain a holding circuit to cause the stepper S(1) to continue to rotate the switch until the contact 81 comes to rest on 84. The contact ring 82 is also provided with a notch 85 along its inner edge and an insulated point 86 in the notch to break the circuit to the signal generator at the home position. This notch and point are at a lesser radius than notch 83 and contact 84, and consequently are not engaged by the contact 81 but are utilized as a part of the time interval signal generator.

The time signal generator includes a circuit interrupter capable of being set to generate a time signal of different duration, corresponding to each of the different title cards listed on the chain 31. To this end the shaft 65 carries a second spring switch arm 88 also insulated from the shaft and insulated from the arm 79 but having two blades fixed in opposite directions to bridge the space between the homing contacts and the interrupter contacts. The shorter arm of the spring 88 carries a contact 87 adapted to ride over the inner edge of the ring contact 82 and across the notch 85 and point 86, while the longer blade is bent in the opposite direction and carries a contact 89 to engage the surface plate 93 of an interrupter gear 91. The interrupter gear 91 is mounted on the shaft 65 and engages a pinion 92 carried by the chain sprocket shaft 33. The gear 91 includes a flat contact plate 93 extending around its entire surface, except for a small insulating button 94. The plate 93 is engaged at all times by the opposite ends of an edged contact spring 95 carried on one of the spacers 35, but is insulated from the spacer by a sleeve 96. The gear 91 is free to rotate on the shaft 65, however, so that its angular position on the shaft is governed solely by the gear 92. Thus whenever the sprockets 32 are rotated to move the chain, the gear 91 is correspondingly rotated, and an insulating button is shifted to a different angular position. Since there are forty-one links in the chain the interrupter is geared to move one forty-first part of a revolution for every link on the chain. It will thus be apparent that one position of the insulating button 94 of the interrupter gear will correspond to the home position of the contact 89, and that every other position will be angularly spaced away from the home position a different distance.

Figure 9:
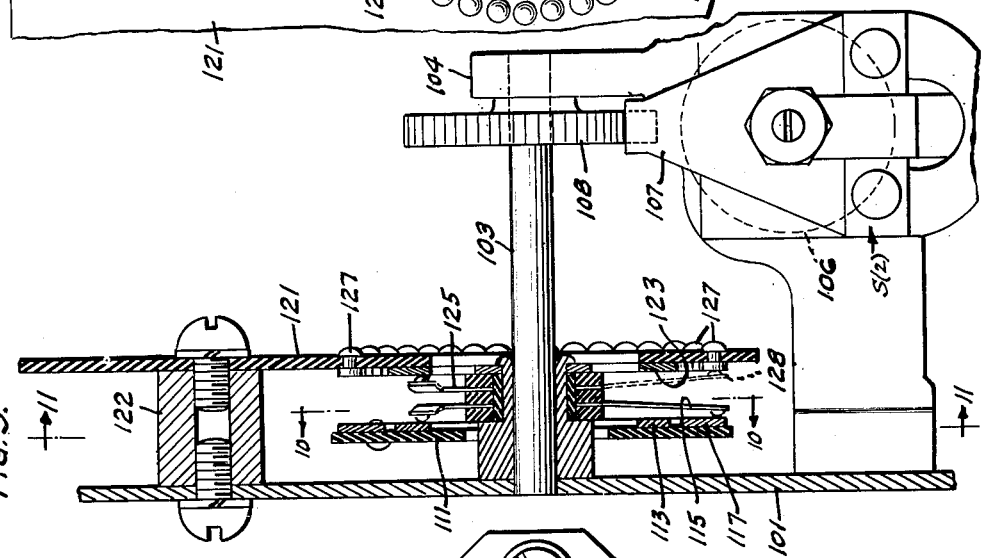
Figure 9 is a central sectional view of the power operated selector switch and homing contacts of the receiving unit.
Figure 10:
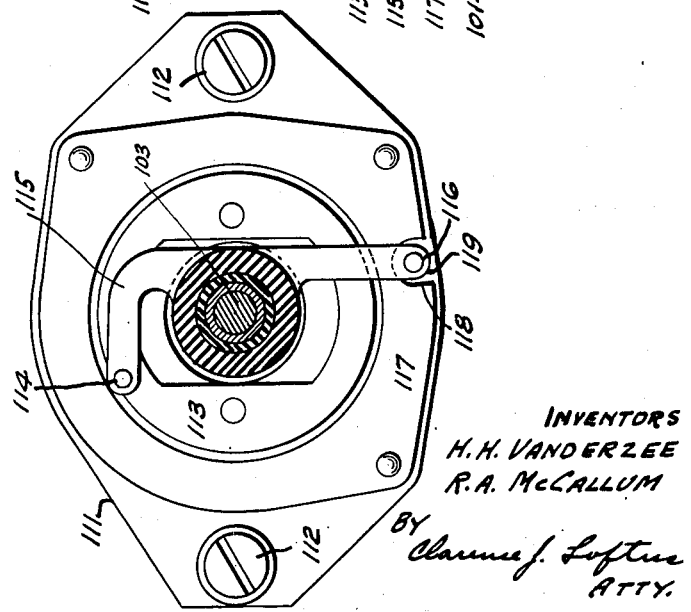
Figure 10 is a detail sectional view of the homing contacts of the selector switch, and is taken substantially on the plane of the line 10—10 of Figure 9.

The receiving unit of the selector mechanism is housed in the phonograph cabinet. In brief, the receiving unit comprises a power operated scanning switch having forty-one contacts. The scanning switch is driven by a synchronous motor and includes self-energized homing contacts, so that when the switch is actuated its movable contactor progressively advances over all of its multiple contacts in rapid succession. The rate of advance is at a fixed rate of speed, however, and since each of the multiple contacts of the switch is connected to a different magnet winding of the mechanical record selector, it follows that by interrupting the movement of the switch arm at a predetermined time interval after it begins to move it may be caused to stop on any desired contact. If the switch arm is then energized any desired one of the selector magnets may be actuated. The switch of the receiving unit is illustrated in Figures 9, 10 and 11 where it will be seen that it includes a mounting plate 101 on which a bracket 102 is secured, so that rotary switch shaft 103 may be journaled between bearings in the plate 101 and in a boss 104 on the bracket. The bracket 102 also carries a synchronous stepping motor S(2) identical to the stepper previously described, and having an armature 106 to actuate a spring finger 107 engaging a toothed ratchet wheel 108 on the shaft 103. Thus, each time the stepper magnet S(2) is energized the spring finger 107 advances the ratchet wheel a distance of one tooth. There are forty-one teeth on the ratchet wheel, corresponding to the forty-one contacts of the selector switch. A spring leaf detent 109 prevents overtravel of the ratchet as well as preventing return movement.

The shaft 103 carries two sets of switching contacts. The first of these is a set of "homing" contacts arranged so that after the stepping motor S(2) is energized from an external source and begins its movement, its own contacts will close a holding circuit and cause it to continue to advance a full revolution and again stop at its home position. The "homing" contacts are mounted on an insulating sheet 111, spaced away from the plate 101 by a pair of mounting posts 112. The contacts include a central commutator ring 113 which is at all times engaged by a contact 114 on a spring arm 115. A contact 116 on the opposite end of the spring arm rides around an outer ring 117, which has a notch 118 in the path of movement of the contact 116, and an insulating point 119 located in the notch. The spring switch arm is on an insulating mounting on the shaft 103. The contacts of the selector switch are mounted on an insulated sheet 121, supported from the plate 101 by a number of spacers 122. The sheet 121 carries a commutator 123, surrounding the shaft 103, so that a contact 124 on the spring switch arm 125 will be in constant engagement with the commutator ring. The spring arm 125, like the spring 115 of the homing contacts, is carried in an insulating mounting on the shaft 103. A contact 126 on the opposite end of the switch arm 125 rides around the circle of the selector contacts 127 so that as the shaft 103 is rotated the switch arm passes over all of the contacts in rapid succession. There are forty-one of these contacts disposed about the center of the switch. Forty of the contacts are connected to the multiple magnet windings of the record selector mechanism. The remaining contact 128 is idle, and acts merely as an insulating point for purposes of convenience in the circuit.

The operation of the selector system is best explained with reference to Figure 14 which comprises a schematic wiring diagram of the wall box and the receiving unit in the phonograph, referred to in describing the various steps through which the circuit passes as the selection is made.

In Figure 14, the receiving unit is shown as connected to three separate remote control units, each indicated by one of the broken line boxes. In this connection it will be remembered that a typical automatic phonograph installation contemplates the control of the phonograph from several remote stations, and the three stations illustrated are merely by way of example, since the system will function in exactly the same manner with more or fewer stations. In fact, the only apparent limitation on the number of stations is the capacity of the power source used to energize the illuminating lamps in the various boxes.

The power source is preferably a step-down transformer T, having its primary windings adapted to be energized by any ordinary 110-120 A. C. line circuit and having a secondary winding delivering about twenty-four volts, which is transmitted through the line conductors L(1) and L(3) to each of the wall boxes to energize the illuminating lamps. Conveniently, these lamps may include four 6-volt lamps 54, in series. Each of the wall box circuits includes a credit circuit relay CC and a pair of oppositely disposed oxide rectifiers R(1) and R(2), in addition to the synchronous stepping motor S(1), the coin switch CS(1), detent switch D(1), and push-button PB, previously described in connection with the structure of the box.

The sequence of operations in making a selection is that a coin is first dropped into the chute to establish a "credit circuit" and the selector control knobs are then moved to bring the title card of the desired selection to the index point 14. The push-button 16 is then depressed to make the selection. The credit circuit relay CC has two pair of contacts CC(1) and CC(2), each of which are closed only when the winding of the relay is energized. This relay winding CC and the coin switch CS are in series between the line L(1) and L(3) so that whenever the coin switch contacts CS are momentarily closed by the passage of a coin, the relay pulls in, closing a holding circuit through the contacts CC(2) and H(1) to hold the relay energized after the coin switch contacts CS reopen. The homing contacts H(1) represent the union between homing contact 84 (Figure 6) to the switch rotor parts 77, 79, 80 and 81. The circuit is now in a condition where the path of first current flow is through CS and the winding CC, and the holding circuit current continues to flow through CC(2) and the contacts H(1). In this connection it is also to be noted, however, that although no current flows through the push-button contacts PB yet the credit circuit for the unit has been set up by the closing of the relay contacts CC(1) to connect the push-button to the line L(3) through the rectifier R(2) and detent switch D(1).

The desired record title is now moved to a position in front of the indexing marker 14. This movement of the chain 31 acts through the pinion 92 to set the angular position of the interrupter gear 91 and its insulating button 94 at any one of forty-one different positions. As the chain is moved, however, the detent switch D(1) opens between each selection so that actuation of the push-button is ineffective unless the title is properly aligned with the index marker. The push-button contacts PB are then closed to choose the selection.

Closing of the contacts PB permits unidirectional flow of current from the line L(3) through D(1) and rectifier R(2) and thence through CC(1) and PB to the windings of a relay CR in the receiving circuit, from which it flows through the homing contacts H(4). The contacts H(4) represent the union between the homing contacts 119 (Figure 10) and the contact 116, arm 115, contact 114 and commutator 113 of the power operated switch, previously described. The relay CR includes three pairs of normally open contacts CR(1), CR(2) and CR(4), as well as two pairs of normally closed contacts CR(3) and CR(5). Thus, when the winding is energized, contacts CR(1) close to complete a circuit from line L(1) through the homing contacts H(4) to winding CR, and thence through the rectifier R(3) and relay contacts CR(1) to line L(3). This circuit permits unidirectional current flow through the winding in the opposite direction to the current it received from the push-buttons, but holds the relay in for the following half cycle. The closing of the contacts CR(1) also closes the circuit from line L(1) through stepper S(1) and rectifiers R(1) and R(3), and since these rectifiers are polarized in the same direction, they permit a unidirectional flow of current through the windings S(1). The windings are thus energized by a pulsating direct current of sixty cycles per second, which will cause the switch ratchet wheel and shaft to begin a stepping movement of sixty notches per second. The closing of contacts CR(1) also completes a circuit from the line L(1) through the rectifier R(5) and thence through the windings of the synchronous stepping unit S(2) in the receiving unit. This is also a half-wave current, so the stepper will begin to step around in exact synchronism with the movement of S(1). A third circuit from line L(1) to line L(3) is completed through the rectifiers R(6) and the winding TD of a time delay relay, having normally open contacts TD(1) in the circuit of the mechanical record selector of the phonograph, and contacts TD(2) in the receiving unit. This relay is also bridged by a condenser which takes on a sufficient charge to cause a time delay of about a twentieth of a second after the opening of its contacts before the relay falls out. The closing of relay CR also closes the contacts CR(4) of the record selector circuit. These contacts are connected to count the number of operations of the phonograph, and the counter will be energized at this point of the circuit operation by the closing of contacts TD(1). The contacts CR(2) of the relay set up a holding circuit to hold the relay energized after the homing contacts H(4) are opened by rotation of the stepper S(2).

From the above it will be seen that the relay CR is originally closed by a circuit completed from line L(3) through D(1), R(2), CC(1) and PB, and thence through H(4) to line L(1). This energizes both steppers S(1) and S(2) through the same contacts CR(1) and these provide means to start the steppers S(1) and S(2) at the same precise instant. In addition, the arrangement is effective to complete the circuit in that portion of the cycle of the current source in which the current is tending to flow from line L(3) to line L(1), but since the rectifiers R(1) and R(5) prevent flow in this direction the steppers will not be actually energized until the next half cycle. This is of importance since it means that the steppers will each become energized at the beginning of a half-wave cycle of the energizing current, so that a positive start is assured.

The step of the operation just described having energized both of the synchronous stepping motors S(1) and S(2) will advance the homing contacts of each of these motors, and the selector switch arm 126 will move to the idle contact 128. At this time the homing contacts H(1) open to break the circuit through the credit circuit relay CC, which falls out and opens the contacts CC(1) through which the push-button is energized, and the holding contacts CC(2). The circuit is closed through the homing contacts H(2) and H(3), however, and through the interrupter contacts I to complete a circuit from line L(3) to line L(2). The homing contacts H(4) of the receiving unit have opened at this time, but the homing contacts H(5) have simultaneously closed; so that a circuit is completed from line L(2) through the relay winding CR, and thence through the contacts CR(2) and H(5) to hold the relay energized. The relay TD is held closed by the condenser C. This completes the first step of movement of the power operated switch and of the interval timer. The next step occurs in the next half of the cycle, when the polarity of the lines L(1) and L(3) is again reversed, and another pulse is transmitted through the windings S(1) and S(2), advancing the switch arm 126 to the second contact. Now, the circuit to the stepper S(1) is completed through rectifier R(1) and homing contacts H(2) to the line L(3), while the circuit through the stepper S(2) is completed through the rectifier R(5) and through the relay contacts CR(1) as before. The time delay relay is again energized through the rectifiers R(6).

The steppers S(1) and S(2) thus continue to operate synchronously, in accordance with the alterations of the supply current, until the rotating switch arm 88 strikes the insulating button 94 on the disc 93. This opens the interrupter contacts 1 and breaks the circuit previously established from the line L(3) through the homing contacts H(2) and H(3) and to the windings of the relay CR, so that although a circuit through the windings CR is still completed through the rectifier R(3) during half of the alternating current cycle, it is opened during the other half, allowing the relay CR to fall out. Actuation of this relay opens the contacts CR(1), CR(2) and CR(4), and closes CR(3) and CR(5). The opening of contacts CR(1) breaks the circuit through the winding of the synchronous stepping motor S(2) so that the motor stops, with the switch arm 126 resting on one of the contacts 127, corresponding to the position of the interrupter button 94. The time delay relay TD remains in for a fraction of a second, however, so that a circuit is completed through the contacts TD(1) and CR(5) to energize the record selector magnet. This causes the mechanical record selector to play the record desired, and the selection operation is completed.

The circuits prepare themselves for the next operation by advancing both steppers to their original home position so that they will be in position to initiate another operation. The homing operation of the wall box stepper is so arranged that the circuit through S(1), R(1), and H(2) is not broken. The result is that the wall box switch does not stop at any point, but continues in its step by step motion until the homing contacts H(2) break. This occurs simultaneously of the opening of the contacts H(3) and the closing of the contacts H(1), so that the circuit is again in the original condition.

In the receiving unit, the fact that the time delay relay TD held the contacts TD(2) open for a moment after the opening of the contacts CR(1) causes the stepper S(2) to stop for a fraction of a second. However, as soon as the time delay relay TD falls out and the contacts TD(2) close, a homing circuit is completed from the line L(1) through contacts H(5), CR(3), TD(2) and thence through the windings S(2) and the rectifier R(4), so that a unidirectional pulsing current is fed through the motor to step it to home position where the contacts H(5) break and cause it to stop. The breaking of H(5) occurs simultaneously with the closing of contacts H(4), so that the receiving circuit is again in its original position and ready to function again.

From the foregoing description, it will be apparent that by following the teachings of this invention it is entirely practicable to provide an automatic phonograph control system including any desired number of coin controlled wall boxes, each having its own selector mechanism, so that selection may be made interchangeably from any one of a number of points remote from the phonograph. The selection information is transmitted to the phonograph quickly and in such a manner that the operation of one remote control box does not in any way interfere with the like operation of the other boxes. By this is meant that while each includes its own time interval signal generating mechanism, initiated by the closing of a relay at the phonograph, yet the circuits are so designed that only the signal mechanism of the box whose push-button is depressed is actuated.

It is important to note that the system requires only one conductor to the wall boxes in addition to their lighting circuits, so that only three conductors are required to complete the illuminating circuit and credit (coin control) circuit as well as the record selection circuit.

Further, these important advantages are accomplished by an arrangement which does not introduce other objectionable features into the machine, particularly since it does not require the large number of switch points at the wall boxes, nor utilize pulsing contacts or complicated mechanical devices characterizing many of the prior art controls. The circuits are notably economical in their power requirements, since the power requirements for the selection operating itself is negligible, and the lamp circuits are so related that these use a simple alternating current source, rather than being energized through a rectifier as the design of some prior devices has required.

It will thus be apparent to those acquainted in the art that the mechanism here disclosed marks a valuable forward step in the development of control systems of this type, and for the first time makes possible the installation of systems having a large number of remote control wall boxes which combine the desirable features heretofore apparently irreconcilable, and yet are inexpensive to manufacture, economical in their power requirements, dependable in their operation and adapted to be connected to the phonograph unit by a simple three-wire conductor.

The form of the invention illustrated in the drawings of this disclosure and described herein is a present preferred form, as now commercially manufactured. It is to be recognized, however, that various departures from the exact structure shown may be made without sacrificing all of the advantages of these teachings, and it is accordingly pointed out that the scope of the inventive concept is not limited to this precise construction, but extends equally to any variations or modifications coming within the scope of the appended claims.

Having thus described our invention, what we claim as new and desire to protect by United States Letters Patent is:

1. In a remote control selector system, the combination, with an automatic phonograph having a mechanical record selector and a receiving unit in the phonograph, and a remote control unit with a manually operable title selector; of means including a synchronous motor in the remote control unit to generate a time interval signal of different duration for each title, and means including a power operated scanning switch in the receiving unit responsive to the time interval signal to select one of a multiplicity of records in accordance with the duration of the signal.

2. In a remote control phonograph record selector system, the combination, with a remote control station having a time interval signal generator and a receiving station having a mechanical record selector, of a scanning switch having a fixed contact for each record selection and a shiftable contact adapted to engage all of the fixed contacts in rapid succession; power operated means to drive said scanning switch including homing devices to cause it to have a normal position of rest; means for initiating the movement of said switch in response to the beginning of a time interval signal from the remote control station, and means for energizing the shiftable contact of the scanning switch in response to the termination of the time interval signal to close a circuit through one of the fixed contacts; together with means including manually operable push-button contacts at the remote control station to initiate operation of the scanning switch and time interval signal generator at the same instant.

3. In a remote control phonograph record selector system, the combination, with a remote control station having a time interval signal generator and a receiving station having a mechanical record selector, of a scanning switch having a fixed contact for each record selection and a shiftable contact adapted to engage all of the fixed contacts in rapid succession; power operated means to drive said scanning switch including homing devices to cause it to have a normal position of rest; means for initiating the movement of said switch in response to the beginning of a time interval signal from the remote control station, and means for energizing the shiftable contact of the scanning switch in response to the termination of the time interval signal to close a circuit through one of the fixed contacts; together with means to initiate operation of the scanning switch and time interval signal generator at the same instant.

4. In a remote control phonograph record selector system, the combination, with a remote control station and a receiving station having a mechanical record selector, of a manually operable record title selector at the remote control station and a time interval signal generator responsive to the manipulation of the record title selector and driven by a synchronous motor to generate a time interval signal of different duration for each selection; and a receiving unit including a scanning switch having a fixed contact for each record selection and a shiftable contact adapted to engage all of the fixed contacts in rapid succession; power operated means comprising a synchronous motor to drive said scanning switch including homing devices to cause it to have a normal position of rest; means for initiating the movement of said switch in response to the beginning of a time interval signal from the remote control station and means for energizing the shiftable contact of the scanning switch in response to the termination of the time interval signal to close a circuit through one of the fixed contacts; together with means comprising manually operable contacts at the remote control station to initiate operation of the scanning switch and time interval signal generator at the same instant.

5. In a remote control phonograph record selector system, the combination, with a remote control station and a receiving station having a mechanical record selector, of a manually operable record title selector at the remote control station and a time interval signal generator responsive to the manipulation of the record title selector to generate a time interval signal of different duration for each selection; and a receiving unit including a scanning switch having a fixed contact for each record selection and a shiftable contact adapted to engage all of the fixed contacts in rapid succession; power operated means to drive said scanning switch including homing devices to cause it to have a normal position of rest; means for initiating the movement of said switch in response to the beginning of a time interval signal from the remote control station and means for energizing the shiftable contact of the scanning switch in response to the termination of the time interval signal to close a circuit through one of the fixed contacts; together with means comprising manually operable contacts at the remote control station to initiate operation of the scanning switch and time interval signal generator at the same instant.

6. In a remote control selection system, the combination, with a mechanical record selector having multiple selection magnets, of a control system including a multiple contact selector switch adapted to energize said record magnets; means to progressively advance the switch through all of its positions to scan all of the switch contacts, together with a manually operable title selector at a control station remote from the phonograph; an interval timer in the remote control station, means responsive to the operation of the title selector to set the adjustment of the interval timer to a different interval for each title, and means to transmit a signal from the interval timer through the selector switch to energize a contact of the selector switch corresponding to the duration of the time interval signal and thus energize a selection magnet of the mechanical record selector to select the record corresponding to the title selected at the remote control station.

7. In a remote control phonograph record selector mechanism, the combination, with an automatic phonograph having a mechanical record selector and at least one remote control station, of a multiple contact rotary selector switch for a mechanical record selector of the phonograph and means located in the phonograph to progressively advance the selector switch across its contacts at a fixed rate; a timer including a synchronous motor at the remote control station, with means for electrically connecting the timer with the advancing means of the switch causing the switch to advance; a manually shiftable title selector at the remote control station, with means responsive to the actuation of the manually shiftable title selector to set the timer at a different predetermined interval corresponding to each of the several selections, whereby different time interval settings of the timer will advance the selector switch to different contacts to effect the selection of a record corresponding to the title selected at the remote control unit.

H. HERBERT VANDERZEE.
ROBERT A. McCALLUM.

REFERENCES CITED

The following references are of record in the file of this patent:

UNITED STATES PATENTS

| Number | Name | Date |
|---|---|---|
| 302,723 | Strimes | July 29, 1884 |
| 875,660 | Haig | Dec. 31, 1907 |
| 983,438 | Gruskin | Feb. 7, 1911 |
| 1,525,431 | Phillips | Feb. 3, 1925 |
| 1,639,987 | Coupland | Aug. 23, 1927 |
| 2,136,630 | Massonneau | Nov. 15, 1938 |
| 2,167,061 | Andres | July 25, 1939 |
| 2,222,218 | Wallace | Nov. 19, 1940 |
| 2,233,026 | Mock | Feb. 25, 1941 |
| 2,296,760 | Barry | Sept. 22, 1942 |
| 2,319,788 | Bryan et al. | May 25, 1943 |
| 2,324,908 | Collison | July 20, 1943 |
| 2,327,429 | Hull | Aug. 24, 1943 |
| 2,346,238 | Schmidt | Apr. 11, 1944 |